United States Patent
Ryan et al.

(10) Patent No.: US 9,826,358 B2
(45) Date of Patent: Nov. 21, 2017

(54) METHOD AND SYSTEM FOR GEOLOCATION AND COORDINATED COMMUNICATION WITH EMERGENCY RESPONDERS

(71) Applicant: GeoVisible, Inc., Seattle, WA (US)

(72) Inventors: David James Ryan, Jackson, WY (US); C. James Judson, Seattle, WA (US)

(73) Assignee: GeoVisible, Inc., Seattle, WA (US)

( * ) Notice: Subject to any disclaimer, the term of this patent is extended or adjusted under 35 U.S.C. 154(b) by 0 days.

(21) Appl. No.: 15/380,888

(22) Filed: Dec. 15, 2016

(65) Prior Publication Data

US 2017/0099579 A1     Apr. 6, 2017

Related U.S. Application Data

(63) Continuation-in-part of application No. 15/201,168, filed on Jul. 1, 2016.
(60) Provisional application No. 62/276,174, filed on Jan. 7, 2016, provisional application No. 62/190,450, filed on Jul. 9, 2015, provisional application No. 62/190,445, filed on Jul. 9, 2015.

(51) Int. Cl.
*H04M 11/04* (2006.01)
*H04W 4/02* (2009.01)
*H04W 4/22* (2009.01)
*H04M 3/51* (2006.01)

(52) U.S. Cl.
CPC ......... *H04W 4/022* (2013.01); *H04M 3/5116* (2013.01); *H04W 4/028* (2013.01); *H04W 4/22* (2013.01); *H04M 2242/04* (2013.01)

(58) Field of Classification Search
None
See application file for complete search history.

(56) References Cited

U.S. PATENT DOCUMENTS

2017/0148306 A1*   5/2017   Wolfson ............... G08B 25/016

* cited by examiner

*Primary Examiner* — Suhail Khan

(57) ABSTRACT

This disclosure provides a method and system for tracking and communicating with responders in the event of an emergency situation. An emergency server coupled to a wireless telecommunications network receives a notification of an emergency situation, establishes a first geofence around a location of the emergency situation, determines a set of candidate responders registered to an area associated with the location, transmits a request for UE locations of the set of candidate responders to a location server and receives a response, determines which UEs of candidate responders are within an area bounded by the geofence, and transmits messages soliciting responders to the UEs.

20 Claims, 5 Drawing Sheets ized, that is, communications to and from

METHOD AND SYSTEM FOR GEOLOCATION AND COORDINATED COMMUNICATION WITH EMERGENCY RESPONDERS

CROSS-REFERENCES TO RELATED APPLICATIONS

The present disclosure claims priority to U.S. Provisional Application No. 62/276,174, filed on Jan. 7, 2016 and is a continuation in part of U.S. application Ser. No. 15/201,168, filed Jul. 1, 2016, which claims priority to U.S. Provisional Application No. 62/190,450, filed Jul. 9, 2015 and to U.S. Provisional Application No. 62/190,445, filed Jul. 9, 2015, each of which are incorporated by reference herein for all purposes.

BACKGROUND

Conventional wireless Emergency 911 services (E911) are focused on the initial link between an emergency caller and an emergency dispatcher. While this is certainly a valuable service, it provides only the most rudimentary capabilities related to complex emergency scenarios and does not make optimal use of modern smartphone capabilities nor more sophisticated information collection, correlation and retrieval.

In a typical wireless E911 call session a voice call is established from a system user to an emergency dispatcher that then notifies the appropriate response agency (e.g. police, fire, etc.). This process focuses on collecting a verbal description of the emergency event, logging the call and notifying the response agency. Little additional information is gathered even though modern smart phones are capable of collecting additional potentially valuable information. The limited collection of emergency event information leads to minimal information being passed to responding agencies and does not facilitate the ability to assist the responding agency. Due to the limitations of conventional emergency response systems, the most appropriate personnel may not be dispatched to a given emergency situation.

TECHNICAL FIELD

Embodiments of the present disclosure relate to systems and methods for improving communications to and from professional and volunteer emergency services personnel utilizing wireless subscriber device geo-positioning. This disclosure applies to a broad range of emergency services scenarios including medical, law enforcement, fire, search and rescue, emergency roadside repair, etc.

BRIEF SUMMARY

Embodiments of this disclosure provide a method and system for identifying user equipment in a cellular telecommunications network.

An embodiment of a method for identifying and designating responders for an emergency situation includes receiving, at an emergency server coupled to a wireless telecommunications network, a notification of an emergency situation, establishing a first geofence around a location of the emergency situation, determining a set of candidate responders registered to an area associated with the location of the emergency situation, transmitting a request for locations of user equipment (UEs) of the set of candidate responders to a location server, receiving the locations of the UEs from the location server, determining which UEs of candidate responders are within an area bounded by the geofence, transmitting first messages to the UEs, the first messages including a request to respond to the emergency situation, receiving second messages in response to the first messages, the second messages indicating a positive response to the request, adding identities of the UEs from which second messages were received to a list of one or more active responders, and tracking locations of the one or more active responders until the emergency situation is resolved. The location server may be an enhanced Serving Mobile Location Server (eSMLC) or a Serving Mobile Location Server (SMLC).

A method may include determining a number of active responders to respond to the emergency, and when a number of the UEs of candidate responders is less than the number of active responders to respond to the emergency, enlarging the size of the geofence to include additional candidate responders. A second geofence may be established around the first geofence, and third messages may be transmitted to candidate responders within the second geofence and outside of the first geofence that alert recipients of the presence of the emergency situation.

A method may include providing locations of active responders to an emergency coordinator, and the set of candidate responders may include volunteer responders and professional responders. In an embodiment, the notification of the emergency situation is received by the emergency server from a UE of a subject of the emergency situation. Locations of the one or more active responders may be provided to the subject of the emergency situation. The notification of the emergency situation may be received by the emergency server from an emergency call center.

DETAILED DESCRIPTION

A detailed description of embodiments is provided below along with accompanying figures. The scope of this disclosure is limited only by the claims and encompasses numerous alternatives, modifications and equivalents. Although steps of various processes are presented in a particular order, embodiments are not necessarily limited to being performed in the listed order. In some embodiments, certain operations may be performed simultaneously, in an order other than the described order, or not performed at all.

Numerous specific details are set forth in the following description in order to provide a thorough understanding. These details are provided for the purpose of example and embodiments may be practiced according to the claims without some or all of these specific details. For the purpose of clarity, technical material that is known in the technical fields related to this disclosure has not been described in detail so that the disclosure is not unnecessarily obscured.

Figure 1:
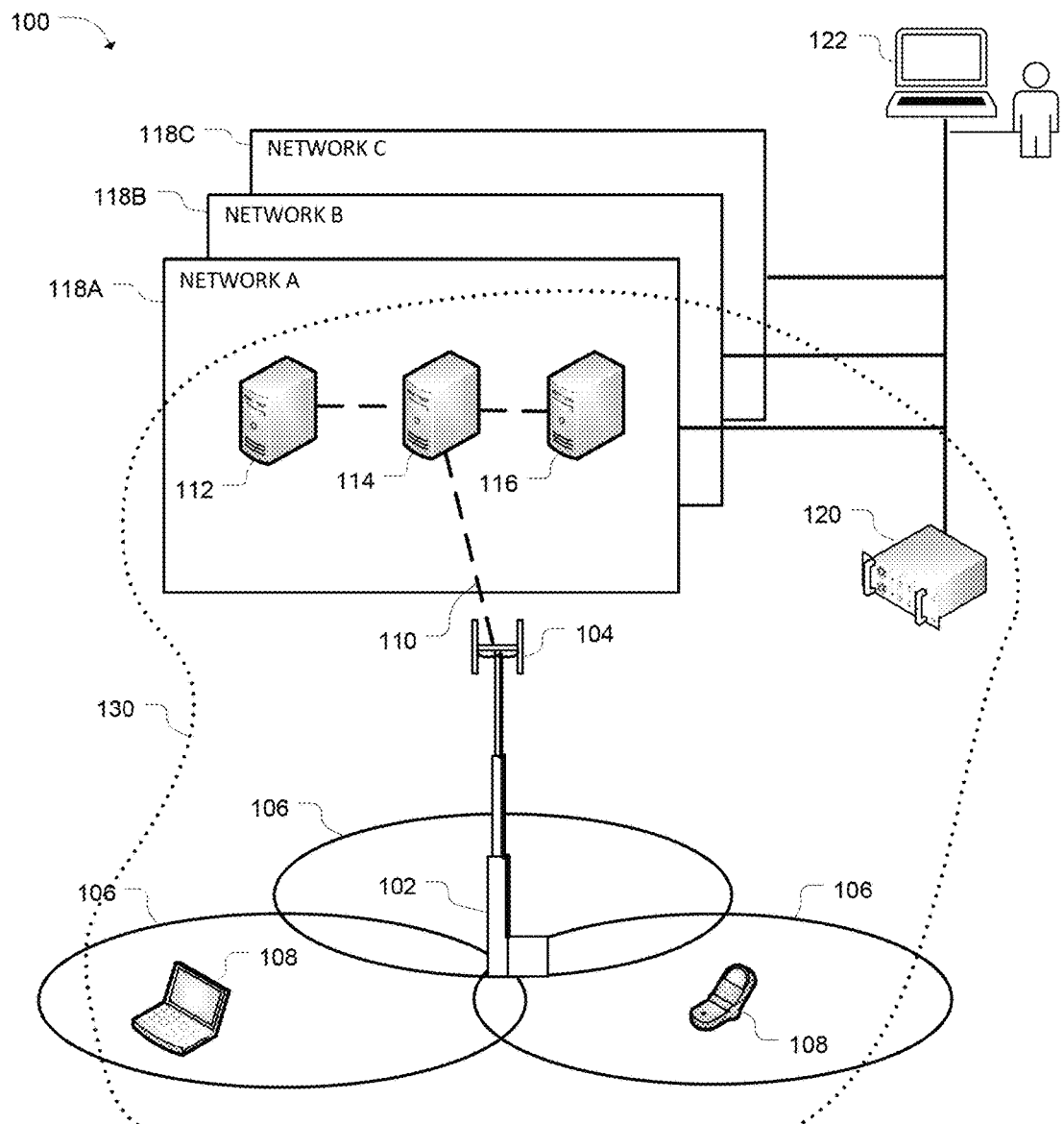
FIG. 1 illustrates a wireless communications system according to an embodiment.

FIG. 1 illustrates a networked wireless communications system 100 according to an embodiment. System 100 may include one or more base stations 102, each of which are equipped with one or more antennas 104. Each of the antennas 104 may provide wireless communication for user equipment 108 in one or more cells 106. As used herein, the term "base station" refers to a wireless communications station that serves as a hub of a wireless network. For example, in a Long Term Evolution (LTE) cellular network, a base station may be an eNodeB.

The base stations 102 may provide service for macrocells, microcells, picocells, or femtocells 106. FIG. 1 shows an embodiment in which base station 102 provides wireless communication services to three cells 106. The cells may be specific to a particular Radio Access Technology (RAT) such as GSM, UMTS, LTE, etc.

Due to the directionality of some RF antennas 104, each base station 102 may serve a plurality of cells arrayed about the base station site. In a typical deployment, a base station 102 provides functionality of three to six cells 106, which are deployed in a sectorized fashion at a site. In other embodiments, one or more base station 102 may be outfitted with an omnidirectional antenna that provides service to a single cell for a given RAT. Multiple base stations 102 may be present at a site and each base station may support one or more cellular communications technologies (e.g., a base station may support UMTS and LTE cells). The one or more UE 108 may include cell phone devices, laptop computers, handheld gaming units, electronic book devices and tablet PCs, and any other type of common portable wireless computing device that may be provided with wireless communications service by a base station 102.

The system 100 may include a backhaul portion 110 that can facilitate distributed network communications between backhaul equipment 112, 114 and 116 and one or more base station 102 within a first operator network 118A. In an embodiment, the backhaul portion of the network includes intermediate links between a backbone of the network which is generally wire line, and sub networks or base stations 102 located at the periphery of the network. The network connection between any of the base stations 102 and the rest of the world may initiate with a link to the backhaul portion of a provider's communications network. The backhaul 110 may include an X2 connection through which base stations 102 communicate with one another directly.

The devices 112, 114 and 116 may be any of a plurality of network equipment such as a Radio Resource Manager (RRM), a Mobility Management Entity (MME), a serving gateway (S-GW), a Radio Network Controller (RNC), a base station controller (BSC), a mobile switching center (MSC), a Self-Organizing Network (SON) server, an Evolved Serving Mobile Location Server (eSMLC), a Home Subscriber Server (HSS) etc. Persons of skill in the art will recognize that network devices 112, 114 and 116 are different depending on the particular RAT or set of RATs that are provided in first operator network 118A.

FIG. 1 shows three different networks 118A, 118B and 118C that are controlled by different operators. In an embodiment, the different operators are independent licensors of RF spectrum, where the different operators control different portions of spectrum. For example, RF spectrum in the U.S.A. is auctioned by the FCC to various cellular providers, which operate separate and independent networks 118A, 118B and 118C. In other embodiments, a network may be controlled by some other entity such as a business or government agency.

In the embodiment of FIG. 1, the three independent networks 118A, 118B and 118C are coupled to an emergency mediation server 120. An emergency mediation server 120 may include one or more computer devices that provide services to a plurality of UEs 108. In an embodiment, UEs 108 may have program instructions stored thereon which, when executed by a processor, communicate with a remote computing device to provide emergency services to a user. The emergency mediation server 120 may include a database that stores preferences and settings for a plurality of users, including emergency contact groups, current locations of users, protocols for handling particular emergency situations, etc.

In an embodiment, the emergency mediation server 120 communicates directly with the Operations Support System (OSS) of one or more operator. Each operator may control and facilitate one or more respective emergency mediation server 120. In another embodiment, one or more independently controlled emergency mediation server 120 interfaces directly with backhaul server components of one or more operator network.

An emergency mediation server 120 that interfaces directly with one or more OSS provides a number of advantages over conventional UE-based emergency solutions, including the amount, type, timeliness and accuracy of data that is available to the emergency mediation server 120. At the same time, the level of complexity to establish such an interface greatly exceeds the complexity of a system which simply polls information from UEs and stores that information on a central server.

In addition, the networks 118 are coupled to an emergency dispatch center 122. An emergency dispatch center may include computer devices and personnel that receive and process requests for emergency services from users. For example, in the U.S.A., dispatch center 122 may be a 911 call center. The dispatch center 122 may receive voice and data from UE 108 directly from the networks 118. In addition, the dispatch center 122 may receive information from the emergency mediation server 120.

Figure 2:
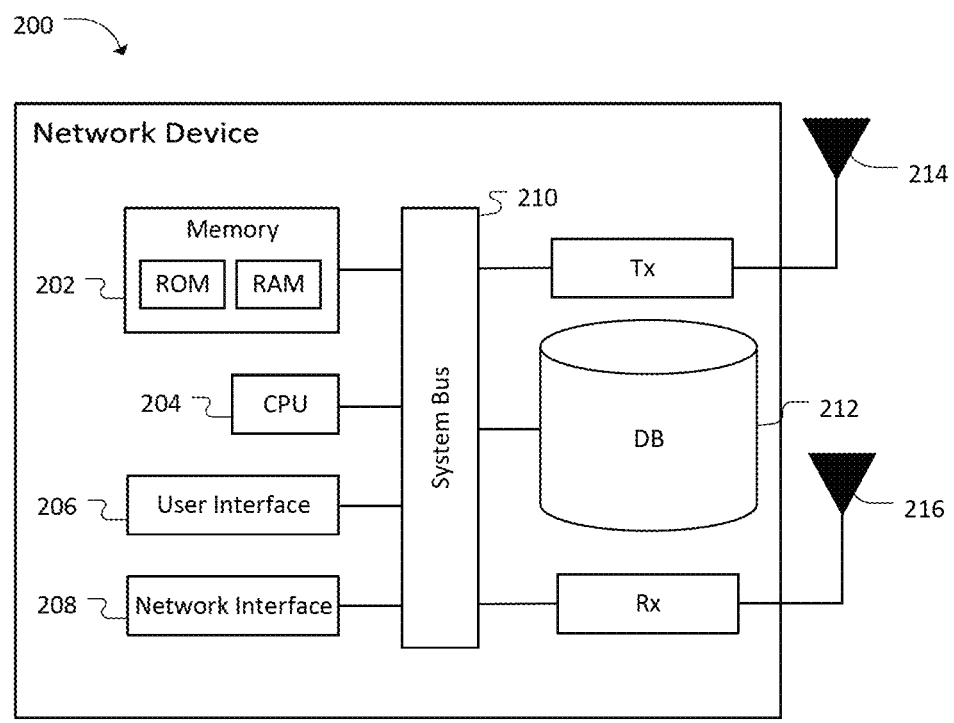
FIG. 2 illustrates a network device according to an embodiment.

FIG. 2 illustrates a block diagram of a network device 200 that may be represent UE 108, network controller devices 110, 112 and 114, an emergency mediation server 120, etc. The network device 200 has one or more processor devices including a CPU 204. The CPU 204 is responsible for executing computer programs stored on volatile (RAM) and nonvolatile (ROM) memories 202 and a storage device 212 (e.g., HDD or SSD). In some embodiments, storage device 212 may store program instructions as logic hardware such as an ASIC or FPGA. The storage device 212 and ROM of memory 202 are non-volatile computer readable media that may have computer executable instructions stored thereon which, when executed by the CPU 204, cause the network device to perform one or more operations according to embodiments of the present disclosure.

The network device 200 may also include a user interface 206 that allows a user to interact with the network device's software and hardware resources and to display the performance and operation of the system 100. In addition, the network device 200 may include a network interface 206 for communicating with external devices, and a system bus 210 that facilitates data communications between the hardware resources of the network device. If the Network device has wireless connectivity, it may have a transmitter 214 and a receiver 216, each of which may include one or more antennas that operate on one or more frequencies.

Embodiments of the present disclosure may be performed by an emergency system 130 that performs a plurality of emergency-related processes. An emergency system 130 may include one or more of the network components shown in FIG. 1, such as the emergency mediation server 120, network devices 112, 114 and 116, user equipment 108, and base station 102. In some embodiments, an emergency system 130 is based on an emergency mediation server 120 with computer-readable instructions stored thereon which, when executed by one or more processor of the mediation server, provide emergency services.

An emergency system may receive, process and route emergency requests between subscribers and the emergency dispatch center 122. In an embodiment, the emergency system 130 may transmit a request for an accurate location (e.g. latitude, longitude) to a geo-location system when not provided as part of the normal emergency call procedure (e.g. for emergency requests initiated through a mechanism other than a 911 call). The geo-location processes may be implemented by the emergency mediation server 120 or may be provided as a service through interfaces to a geolocation system of an operator's OSS, such as an eSMLC.

The emergency system 130 may maintain a subscriber register which includes subscriber profiles and details on subscribers' authorized emergency proxy groups and emergency notification groups with various levels of security. The subscriber register may be implemented as a database of emergency mediation server 120. The subscribers may be users that are subscribed to emergency services provided by the emergency system 130.

An emergency system may be implemented within existing switching systems in the cellular network, and/or as a separate hardware entity with interfaces to a cellular network. A single emergency system may interface to a single cellular network 118 or to multiple cellular networks such as networks 118A, 118B and 118C maintained by different operators.

The emergency system 130 is also capable of storing emergency requests which originate from the emergency dispatch center 122 and performing automated monitoring of the targeted subscriber to enable onward transmission of the requests immediately as conditions allow, for example when a location area update is seen for the subscriber.

The emergency system 130 may also interact with subscriber devices, e.g. UE 108, to ensure that information is only provided to the emergency dispatch center 122 if the subscriber permits this information to be shared. For example, in an embodiment, a subscriber's information is only forwarded to the emergency dispatch center 122 if the subscriber actually places a call to the emergency dispatch center 122. The subscriber's UE 108 may provide confirmation of such a call being placed in a cryptographically secure fashion. This can help prevent malicious or unauthorized retrieval of subscriber information by the emergency dispatch center 122.

In addition, the emergency system 130 may determine a set of cells that define a specific geographic (geo-fenced) area for one or more operational cellular networks 118 in the vicinity of an emergency event. The emergency system 130 may identify, track, and/or confirm the presence of all subscribers within the geo-fenced area and coordinate messaging, status updates and other activities for those subscribers.

In an embodiment, the emergency dispatch center 122 receives incoming emergency requests from subscribers as well as incoming emergency requests in the form of phone calls from family or other members of an emergency proxy group who may be concerned about a subscriber. Elements of the emergency system 130 may be located at an emergency dispatch center 122, such as a hardware device that performs one or more processes in conjunction with other elements of the emergency system to provide subscribers with emergency services.

When an emergency request is received at an emergency dispatch center 122, a determination may be made on the optimal course of action. The emergency dispatch center 122 may then request the emergency system 130 to perform the action. For example, the emergency dispatch center 122 can request the emergency system 130 to transmit communications to all members of an emergency notification group, or to user equipment within a geo-fenced area.

In an embodiment, UEs in a network have a set of program instructions stored thereon that extend functionality of the UE and interface with one or more external hardware devices to provide emergency services to the user. The emergency services may include, for example, the ability for the user to configure one or more emergency notification groups, configure one or more emergency proxy groups, and accept or reject invitations to join other users' emergency notification groups or emergency proxy groups. For example, a subscriber may have one emergency notification group for medical emergencies, one for emergencies related to a car breaking down, etc.

Subscribers may be members of multiple emergency notification groups or emergency proxy groups created by other subscribers. When a subscriber adds a member to a group, an emergency application sends a message to the member, inviting him/her to join the group. The member may accept or reject the invitation. Group information may be stored in a database of an emergency mediation server 120.

In an embodiment, the UE 108 may be in communication with the emergency mediation server 120, and the emergency mediation server may communicate with the UE as well as an emergency dispatch center 122. Accordingly, the emergency mediation server 120 may facilitate communication between the UE 108 and the emergency dispatch center 122, instead of or in addition to communications directly from the UE 108 to the emergency dispatch center 122.

In an embodiment, when a subscriber makes a call to an emergency number such as 911, an emergency request may be automatically transmitted to the emergency mediation server 120, or a request may be transmitted directly to the emergency mediation server 120 from UE 108. On submission of a subscriber initiated emergency request or on reception of dispatch initiated emergency request, UE 108 may perform several processes, including silent initiation of a call in which a data connection is setup through the cellular network, and silent initiation of audio and/or video recording and retrieval of location data, e.g. GPS and Wi-Fi data from the UE.

The data connection between the UE and the emergency mediation server 120 may be used to transfer information about the subscriber including their location data, UE status (e.g. battery level), emergency request type and video/audio data stream to/from the emergency dispatch center 122. In addition, the emergency system 130 may be capable of storing a subscriber initiated emergency request when the UE is out of cellular coverage range and, and performing automated monitoring of the cellular network conditions for onward transmission of the emergency request immediately as conditions allow. In addition, the emergency system 130 may enable forced continuation of the data connection even if the normal emergency call has been terminated and the UE 108 is turned "off."

In an embodiment, a data connection is established between the emergency dispatch center 122 and the emergency mediation server 120 that provides UE data to the emergency dispatch center. For example, the UE 108 may provide one or more of location data, cell phone status data (e.g. battery level), emergency request data related to a category of emergency request, audio data and video data to the emergency mediation server 120. Such data may be processed by the emergency mediation server 120, and selectively transmitted to the emergency dispatch center 122.

Communications between the UE 108, the emergency mediation server 120 and the emergency mediation server 120 may be protected by one or more security mechanism. For example, elements of the UE that relate to emergency services may be protected by a password, in addition to or instead of biometric protection. Data related to the emergency services that is stored on the UE may be encrypted, and all emergency communications between the UE 108 and the emergency mediation server 120 and between the emergency mediation server and the emergency dispatch center 122 may be encrypted as well.

In some embodiments, the UE 108 is authenticated to the emergency mediation server 120, so that the emergency mediation server only accepts communications from authenticated hardware, thereby prohibiting unauthorized devices from communicating on behalf of a particular subscriber. The emergency mediation server 120 may authenticate all communications to and from the emergency dispatch center 122. In addition, membership in various emergency notification groups and emergency proxy groups may require verification from members before they are added to the groups.

Figure 3:
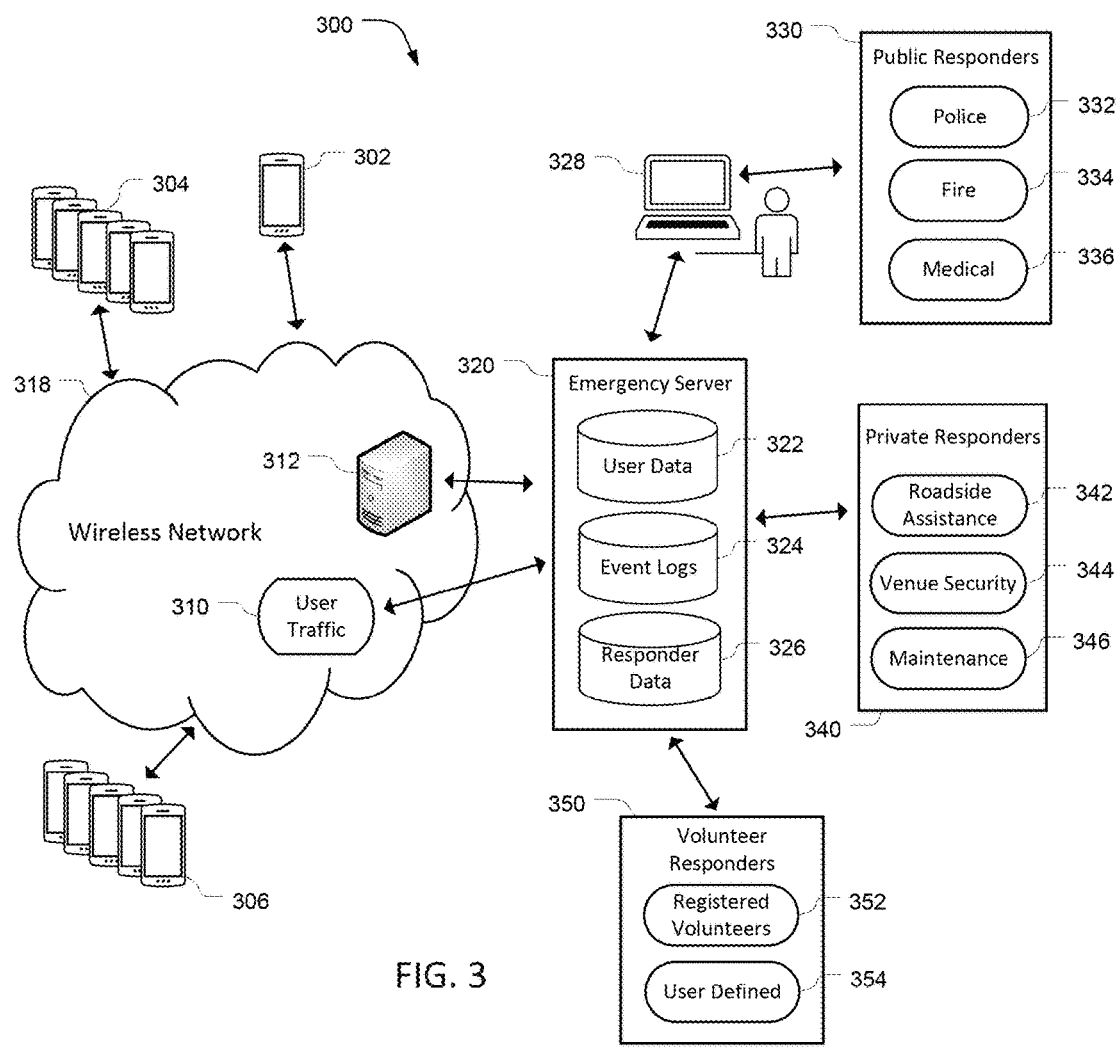
FIG. 3 illustrates an embodiment of an emergency management system.

FIG. 3 shows an embodiment of a system 300 for geolocation and communication with emergency responders. In system 300, an emergency caller has a UE 302 that is in communication with wireless network 318. The emergency caller's UE may implement software that is specific to one or more of the emergency management processes described by this disclosure. The software may be implemented in the form of a dedicated application (EEMS_APP), and/or software that is provided by an operator or telephone manufacturer.

Emergency caller UE 302 may initiate an emergency response process in response to an emergency situation. Alternatively, a process may be initiated in other ways such as a missing persons search initiated by traditional emergency services personnel or by concerned third parties. For example, an emergency response process could be initiated by a municipal entity in response to a natural disaster, or a private business in response to a hazardous situation that occurs on the business premises such as a chemical leak or explosion.

System 300 supports users with wireless devices that are not equipped with, or not currently running, the EEMS_App software. In these cases, the emergency caller UE 302 may be treated as a target UE identified by a device phone number, IP address, Electronic Serial Number (ESN), etc. Accordingly, a user that is the subject of an emergency situation may be referred to generally as a victim or subject of an emergency response.

Wireless network 318 may be a wireless cellular communication network that is maintained by a single telecommunications operator. In some embodiments, the wireless network may 318 include local wireless elements such as Wi-Fi links that couple UE to the Internet through local area networks.

The wireless network 318 includes a location server 312, which may be an eSMLC or SMLC. Location server 312 employs existing and/or enhanced UE location technologies embedded within the wireless network 318. Location server 312 may utilize a variety of processes to estimate the current location of individual system users when requested to do so via external data interfaces. Traditional location servers utilize GPS positioning capabilities of individual UE, and/or position estimates based on cell connectivity and/or measurements made at individual serving and nearby neighbor cells. The performance of embodiments may be improved by enhancing the capabilities of traditional location servers to support geofencing and other features.

The wireless network 318 includes a user traffic subsystem 310, which comprises the content of communications of individuals or groups of system users. Types of user traffic handled by the user traffic subsystem 310 include voice calls, SMS and MMS text messaging, video traffic, and other data transferred to and from system users.

The system 300 includes an emergency coordination server 320, which may be the same physical entity as the emergency mediation server 120 discussed above. The emergency coordination server 320 includes subsystems and performs processes that coordinate and support emergency services for users, victims and responders. An emergency coordination server 320 may be integrated into the network of one or more operator, or a system may include a single server that is coupled to multiple operator networks. Elements of emergency server 320 may be distributed across multiple physical locations.

Information retained by emergency server 320 includes user data 322. System users utilizing the EEMS_App may optionally store personal information into this secure data archive for use during an emergency. User data 322 may include, for example, medical history, drug allergies, primary care physician, family contacts, insurance information, etc. Information stored in this subsystem, especially sensitive personal information, is protected via security mechanisms such as passwords and data encryption and access may be limited during emergencies according to user defined rules. All attempts to access user stored data may be recorded and available for review by users to ensure privacy and data access accountability.

System activities are logged for later review and event auditing in event logs 324 stored by the emergency server 320. The system activities stored by the event logs 324 may include individual and group messaging generated or received by the EEMS_App and the emergency server 320, data shared between responders, location data, etc.

The emergency server 320 may coordinate groups of responders for emergency situations through wireless network 318. FIG. 3 shows two such groups, which are a caller defined group 304 and a dynamically defined group 306. One or more caller defined group 304 may be defined by a given subject 302 to respond to emergencies depending on the nature of the emergency situation. For example, a subject 302 may define a first emergency group 304 for emergency situations in a first geographic region, and a second group for situations in a second geographic region.

In addition, emergency server 320 may coordinate a dynamically defined emergency responder group 306, which may include public responders 330, private responders 340, and volunteer responders 350. Public responders 330 are publically funded or available emergency responders such as police 332, fire personnel 334, and medical personnel 336. Private responders 340 may include a variety of emergency responders that are privately employed, typically for the purpose of providing emergency response services, such as roadside assistance 342, venue security 344, and maintenance personnel 346.

Volunteer responders 350 may include any responders that respond on a voluntary basis, and may include a variety of sources. Volunteer responders may be registered volunteers 352 which are registered directly with the system or an independent agency. An architectural subsystem of system 300 may support the creation of and access to data records of these pre-screened and authorized non-traditional emergency services personnel such that they can be called into service when needed.

Registered volunteers 352 could be volunteer firemen for a geographic region, persons with first aid or similar skill sets that are pre-screened and registered to the emergency server 320, search and rescue volunteers, etc. Other examples of volunteer responders 350 are off-duty emergency responders or medical personnel, volunteer search and rescue personnel, registered roadside assistance personnel, non-professional emergency first responders to assist in large scale emergencies, neighborhood/campus watch volunteers, etc. In addition, a user defined set of volunteers 354 may include responders from the caller defined response group 304.

The system 300 may create and maintain a dynamic list of members of the dynamic responder group 306 along with messaging and tracking guidelines based on group roles and responsibilities. For instance, on-site personnel engaged in hazardous situations (e.g. on-site fire fighters, technical terrain search and rescue teams, etc.) may optionally be position tracked and may have more stringent communication rules than assisting off-site personnel (e.g. hospital admitting staff).

The emergency server 320 is in communication with an emergency dispatch center 328, e.g. a 911 call center. The connection to the emergency dispatch center 328 facilitates access to a variety of public responders 330 for the emergency server 320. While specific emergency dispatch service implementations vary by locale and region, these services are typically provided by emergency dispatch centers 328 with one or more call center operators that call upon public emergency response teams in the event of an emergency.

In some cases, depending on the circumstances of an emergency, system 300 may simply pass incoming user generated emergency calls directly to the appropriate local 911 dispatch center 328. However, in other circumstances, emergency server 320 may manage, organize and facilitate communications for public responders 330. For example, an initial set of public responders may be identified at the call center 328 at the onset of an emergency, and transmit public responder data 326 to emergency server 320 to use to coordinate a response to the emergency. Responder data 326 may include data related to any responder, including public, private and volunteer responders.

Figure 4:
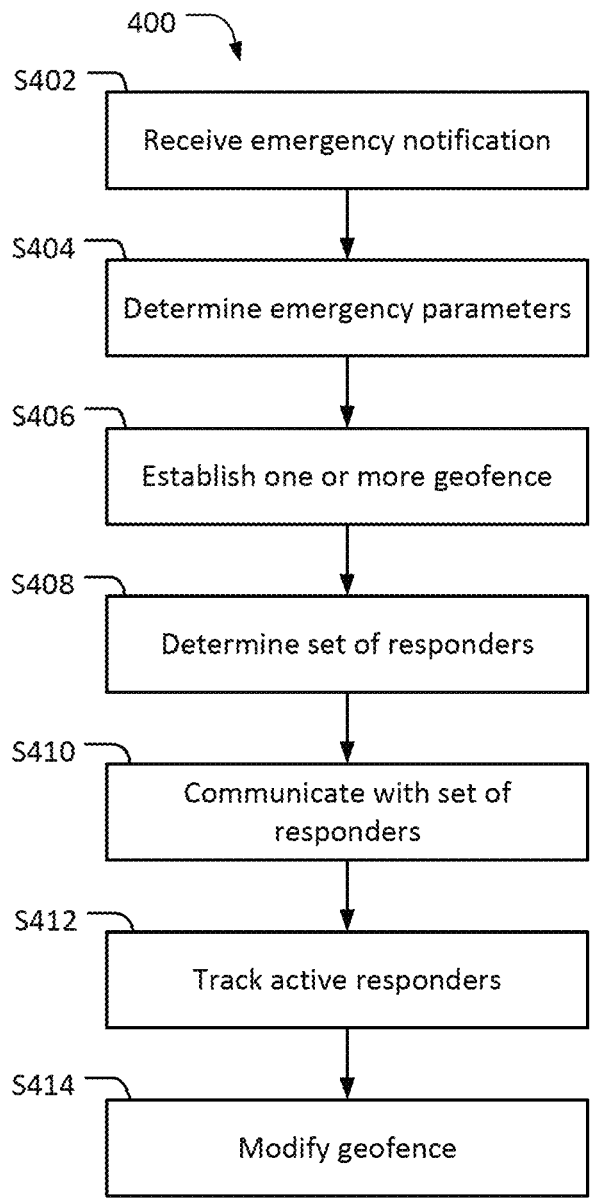
FIG. 4 illustrates a process for geolocation and communication with emergency responders.
Figure 5:
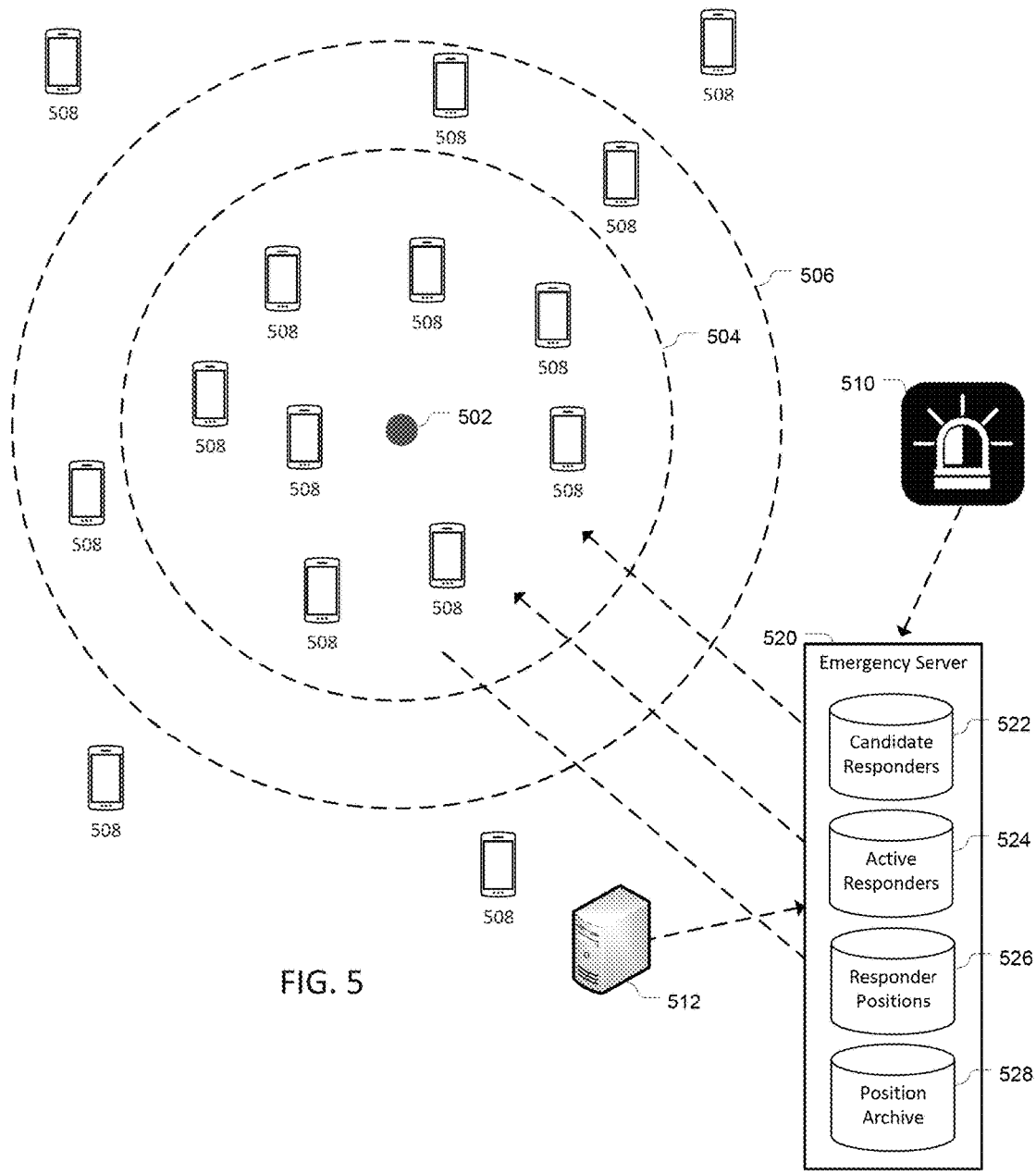
FIG. 5 illustrates an embodiment of an emergency server performing geolocation and tracking of responders.

FIG. 4 shows a process 400 for geolocation and communication with emergency responders according to an embodiment. Elements of process 400 will be explained in conjunction with FIG. 5, which illustrates responders in a geofenced area.

An emergency notification is received at S402. The emergency notification may be received by emergency server 520 from a user through the EMS_APP. In other embodiments, the emergency notification may be received from a government agency such as a 911 call center, a tsunami alert system, etc.

In a first embodiment, the type of emergency associated with the notification may be, for example, a campus, neighborhood or event venue security call, a search and rescue operation or mass casualty event (e.g. commercial plane crash). For each of these types of emergencies, private and/or volunteer responders may be contacted in lieu of, or in addition to, public responders.

Parameters of the emergency situation are determined at S404. A non-exhaustive list of the additional parameters includes 1) a potential cost of the emergency, such as whether it could result in death or injury, or loss of property, 2) a general category of the emergency, such as missing person, fire, earthquake, vehicle accident, ski injury, etc., 3) desirable responder attributes, such as training and skills, availability, and whether the responders are volunteers, private responders or public employees, 4) a geographic center 502 of the emergency, 5) when the emergency affects an area, the extent of the affected area, 6) the size of a geofenced zone 504 in which to notify responders, and 7) a notification message to be sent to appropriate responders.

In an embodiment, one or more of the parameters received at S404 are received from a government agency such as a 911 call center 510. One or more parameters may be received from a user or victim, and some parameters may be predetermined based on information related to the emergency. For example, when the emergency is a user stranded by a malfunctioning vehicle, the extent of the area of the emergency may be limited to geographic coordinates of the vehicle.

A geofence 504 is established for the emergency situation at S406. The extent of an area enclosed by geofence 504 may depend on a number of factors. One factor is the nature of the nature of the emergency situation. Some emergencies have a larger affected area than others, so the size of a geofence 504 may scale to the affected area. In addition, some emergencies would benefit from a larger number of responders than others, so the size of a geofenced zone may scale accordingly.

A geofence 504 may be established by applying geometric constraints around an affected area. For example, a tsunami or earthquake will affect a relatively large area which can be provided to the emergency server 520. The emergency server 520 may then establish a geofence 504 by extending boundaries of the affected area by a predetermined distance. The predetermined distance may be based on a number of factors, including the nature of the emergency, the population density in the area, the time of day (more responders are generally available at certain times), etc.

In some embodiments, the geofence 504 may be based, at least in part, on political boundaries, such as county, city and state lines. Political boundaries are particularly relevant to classes of responders that are limited to certain jurisdictions.

In an embodiment, the geofence 504 is determined by an external agency such as an emergency dispatcher or law enforcement agent that has situational awareness, and provides the geofenced area to emergency server 520. In another embodiment, an emergency management system may determine a geofence at S406 using information received from an emergency call center 510 or other external agency. For example, an emergency call center 510 may indicate a location or area of an emergency. In other embodiments, the emergency management system 300 determines a geofence 504 without input from the external agency.

A set of emergency responders is determined at S408. In one embodiment of S408, the set of emergency responders is a plurality of candidate responders within the geofence 506 established at S406. A list 522 of candidate responders may be stored by the emergency server 520.

The list of candidate responders 522 may be identified in part by determining responder skills and qualifications appropriate to the emergency situation. The emergency server 520 may store relevant qualifications and experience of potential responders. If the emergency is a medical emergency, or an emergency which is expected to have medical implications, then responders with appropriate medical qualifications are added to the list of candidate responders 522. Similarly, if the emergency is in a wilderness setting, then responders with mountain rescue experience may be selected as candidates, while responders with automotive repair skills or towing resources may be chosen to respond to a stranded motorist emergency. In an embodiment, an individual that initiates an emergency caller reporting an emergency situation may be added to the list of candidate responders 522.

Public responders may be included in the set of responders as well. Information for public responders may be identified by a public emergency coordination system 510 and provided to the emergency server 520. The information may include identities of individual public responders, identities of UEs 508 of the responders including cellular identifiers, location information for the responders and responder equipment, status of responders, equipment and capabilities of the public responders, etc. When the emergency server 520 has cellular identifiers for UEs 508 of emergency responders, the emergency server may track locations associated with the cellular identifiers by accessing a cellular location server 512, which may be an SMLC or an eSMLC.

Locations of candidate responders may be used to identify an appropriate set of responders for an emergency situation. The emergency server 520 may create a list of candidate responders 522 with appropriate qualifications that are associated with a general region of the emergency, such as a county, zip code or state, to create a manageable list of candidates for which to query current locations. The emergency server 520 may determine current locations of the candidate responders by querying location server 512. The location data from the cellular location server may be supplemented by or substituted with positioning requests transmitted by the emergency server 520 to UEs 508 of the candidate responders.

The locations of the candidate responders may then be compared to an area within geofence 504, so that the list of candidate responders 522 is constrained to responders within a limited distance of the emergency situation. In an embodiment, response time is an element of selecting a set of responders. Location is an indicator of response time, which may be supplemented with real-time conditions such as traffic conditions, or other obstacles to rapid response, such as conditions related to the emergency.

Emergency server 520 may use such information to identify the most appropriate candidate responders as active responders, which are responders that are actively involved in emergency relief efforts. For example, when a plurality of candidate responders are present within geofence 508 and the emergency situation in question only requires a single responder, emergency server 520 may use response time to determine the candidate responder with the shortest response time as the active responder.

Many potential responders in a region may not be located within a first geofence 504. In an embodiment, one or more additional geofence such as second geofence 506 is established. The emergency server 520 may cause different messages to be sent to UEs 508 of candidate responders that are within the first geofence 504 than messages sent to candidate responders within the second geofence 506. For example, candidate responders that are located between the first and second geofences may receive less time critical messages that alert the candidate responders to the presence of an emergency situation without actually asking the candidate to respond.

The emergency server 520 communicates with candidate responders within the first geofenced area 504 and possibly within the second geofence 506 at S410. The communication may be an event notification message that includes details of the emergency, and prompts a response regarding whether the candidate responder is available. In an embodiment, when responses are received from a predetermined number of candidate responders, then the emergency server signals to other candidate responders that their services are not currently required.

Candidate responders that receive communications soliciting an emergency response may reply to the communications by indicating that they are responding. On receipt of an affirmation response, the emergency server 520 may add a given candidate to a list of active responders 524. Additional checks, such as querying parties involved with the emergency, may be made to confirm that the responder actually responds to the emergency.

As the emergency system communicates with responders at S410, responders may be added to and removed from the active responder list 524 as additional resources become available or become unavailable. Responders may be re-assigned to better match available skills to emergency needs based on the nature and extent of the emergency. In addition, the emergency system may notify responders of changes to the emergency location and/or geofence boundary 504 for the emergency.

The emergency server 520 may cause automated communications to the emergency responder UEs 508, and may receive responses from the responders. In addition, the emergency system may facilitate communications between the responders, for example by creating a shared communication forum for responders. In an embodiment, an individual may be granted control over one or more aspect of the emergency server 520 with respect to a particular emergency in order to coordinate an emergency response. For example, responders may be divided into groups by location, skill set, etc., and the coordinator may transmit commands to each group.

Current locations of active responders may be provided to an emergency response coordinator, who may use the locations to manage the response. Near real time tracking may be performed to provide increased responder safety in high hazard situations (e.g. structure fires). Examples include raising a system warning to supervisors when a responder stays stationary in a hazardous area for too long.

When an emergency situation is resolved, a message may be sent to current active responders of active responder list 524. The message may be sent to UEs 508 of responders within a defined messaging radius or other geofenced perimeter.

Active responder locations are tracked at S412, and the locations of active responders may be used for various processes. For example, the dynamic active responder list 524 may be updated based on responder locations. Equipment identification parameters stored in the active responders list 524 may be supplied to location server 512 to periodically determine the location of the responder(s) in question.

In an embodiment, responder location data is provided to a victim or caller that reports an emergency. Location data for the victim or caller may be provided to one or more responder as well. In such an embodiment, a caller placing a roadside emergency call and a responder may both upload tracking data to the centralized emergency server 520. This allows responders to accurately know and possibly track the location of callers and for callers to access current position information of responders to coordinate meeting and to support validation of appropriate responders as they approach the caller's location. For instance a caller awaiting a tow truck late at night may be informed that the responder they called is approaching as an aid to identifying correct and authorized responders.

For example, if an emergency caller moves for safety or other reasons, responders may be notified on the caller's new position. Similarly, if emergency scene perimeters change (e.g. to avoid an out of control fire), responders may be kept up to date on these changes via shared geo-location information.

The system may be configured to periodically log location information for select or all members of the Active Responder list to support responder safety as well as to support logging and review. Tracking may be enabled on a group basis (e.g. track firefighter location or track only volunteer responders) or it may be enabled for only select responders (e.g. solo search and rescue personnel operating without nearby teammates).

Locations tracked at S412 may be used for additional reasons. Responders moving outside of an area bounded by geofence 504 may be considered out of service or queried to determine if a safety situation exists that must be addressed. Responder tracking supports timely response of closest resources in the case of large area emergency scenarios such as search and rescue operations with dispersed responders.

Responder location tracking archival supports post event safety and event quality analysis to increase responder safety and or response quality for future events. Creation and subsequent maintenance of active responder list 524 may e logged during the emergency event and subsequently archived in position archive 528 for quality review and legal purposes.

A geofence 504 may be modified at S414. In an embodiment, a geofenced region may be established around a UE that signals an emergency, and that geofenced region may move as the UE moves. An emergency server 510 may receive a location of the UE that signals the emergency from location server 512 of the wireless network that provides service to the UE, and establish a geofenced area 504 with a center 502 at the UE's location, so that the geofenced area moves as the UE's location changes. In other words, the geofenced region may be a dynamic element that tracks a user's location.

In the event of a large or long time scale emergency event, such as an event that affects an area of more than a hundred square meters and/or lasts longer than a few hours, triggering parameters including the geofence 504 may be modified to increase the probability of responder notification. For example, in response to a long time duration mass casualty emergency such as a commercial airline crash, qualified volunteer and private responders (e.g. EMTs, wilderness first responders, private ambulance companies, registered volunteer off duty fire or medical professionals, etc.) within a very large area may be repeatedly notified of the emergency. Size and location of the geofence 504 may be change over time as an area affected by the emergency changes, as the emergency situation worsens, or as additional responders are required.

Embodiments of this disclosure apply to a broad variety of emergency service scenarios. Community public emergency services can be supported at a local, regional or national level, including large scale emergencies beyond the resources available by paid emergency personnel such as wide area search and rescue operations and mass casualty events.

Embodiments may be applicable to private localized security such as corporate, college campus and private community security requiring rapid response via local emergency responders. Embodiments also apply to public or private localized security such as event security at a stadium event, theme park or ski resort benefitting from rapid response by nearby responders, and provide support to local or regional businesses providing emergency services such as roadside assistance such that appropriate responders may be notified for nearby requests.

Embodiments of the present disclosure provide several improvements to emergency services. For example, an interface with an operator's OSS provides highly accurate and current location data that is not widely available. Incorporating this data into emergency services provides numerous advantages over conventional emergency services. For example, responder location data can be used to determine one or more geofence for a given emergency, so that appropriate responders are identified efficiently and accurately. Dynamic location elements of emergency services are provided so that emergency services can adapt as a situation evolves. Embodiments can manage numerous types of emergency responders simultaneously, including public responders, private responders, and volunteer responders.

When the emergency situation is resolved, the emergency server 520 may receive a message from a subject of the emergency situation, from an emergency responder, or from emergency call center 510. When such a message is received, the emergency server 520 may terminate communications with responders and store data associated with the response at the position archive 528.

Several examples of an emergency system and method will now be explained. These examples are provided to illustrate how various embodiments of an emergency system can be applied in different situations. The examples are provided to enhance the understanding of the scope of this disclosure, and are not to be construed as limiting.

In a use case, a mass emergency such as an earthquake or tsunami occurs. An emergency mediation server sends an alert to all users in the vicinity of the mass emergency. In such scenarios, communications infrastructure, and in particular voice circuits to emergency call centers, are often overloaded with those trying to report their status and those checking on them. An embodiment of this disclosure may alleviate the strain on call centers by forwarding an assured delivery message to a call center even when voice circuits are not available to facilitate a voice call.

In an embodiment, users can optionally respond to an emergency alert with status (e.g. "ok" or "not ok") and this status is automatically sent to all emergency contacts. Time stamp and any notes from the user are provided to the emergency contacts. Emergency respondents have access to the status so that can utilize this information to better mobilize their resources. In addition, the user, emergency contacts and emergency respondents can participate in a chat room.

In addition to the specific processes described above, an emergency system 130 may perform a number of processes to provide emergency-related services. Some of those processes are disclosed in the following discussion.

In some emergency situations a person in distress cannot interact directly with an emergency services operator. This could occur in scenarios such as abduction or home intrusion. An embodiment enables a covert emergency call to be automatically requested by the person in distress whenever a normal emergency call (e.g. 911 call) is initiated or through a simple sequence of actions on their cell phone. A dispatch center can then initiate services for the emergency call, including geo-location services, and instructs the UE to start video and sound recording if not already initiated. The dispatch center is then able to notify the appropriate emergency services and provide relevant details including the current location. An embodiment also enables the covert call to be continued in cases where the normal emergency call has been terminated and the phone turned "off" by the attacker or victim.

In some emergency situations, a person in distress may call or message a trusted person, such as a friend or family member, instead of an emergency dispatch center. This may occur if the person in distress is incapable of interacting directly with an emergency services operator. An embodiment enables any trusted person in a defined group (e.g., an Emergency Proxy Group) to contact the dispatch center on behalf of the person in distress and for the dispatch center to initiate a call from the cellular network to the device of the person in distress by a dispatch initiated emergency request. The trusted person determines if the call should be covert or a normal connection. Through the established data connection the dispatch center then initiates a request for geo-location and other information for the device and commences video and sound recording. The dispatch center then notifies the emergency services and provides all relevant information collected including the current location.

In some emergency situations, a person may wish to message and/or locate all members of a group such as trusted friends or familial group as configured by the user. This can be in conjunction with a missing person or an incident that affects another member of that group. An embodiment enables the dispatch center, on behalf of the person in distress, to message and/or establish contact with all Emergency Notification Group members and determine their location.

In some emergency situations, it is possible that a person in distress is outside of a cellular network coverage area. This could be in a remote location during a hiking or sailing trip or in other out of coverage areas such as an underground car park or elevator. An embodiment enables an emergency notification to be stored on the mobile phone for relay to the dispatch center as soon as network conditions allow the message to be sent.

In an embodiment, a 911 call is made by a subscriber. A 911 dispatcher sends a user emergency information request to the emergency system. When the dispatcher requests emergency information from the emergency system, the system can a user's cell phone to see if a 911 call is actually taking place. The emergency mediation server retrieves the user's information configured by the caller (e.g., name, address, medical information, photos, etc.). The emergency mediation server 120 then provides this information to the 911 Dispatcher.

In another embodiment, a 911 call is made by a subscriber. The 911 dispatcher transmits a user emergency active request to the emergency mediation server, and a message is transmitted to the 911 caller's UE. The UE is configured to perform a defined set of actions based on user settings. In an embodiment, these actions include enabling GPS in emergency e.g., if disabled otherwise for privacy; enable remote monitoring capabilities (e.g. prevent phone from turn off or entering airplane mode); and enable UE to alert user of emergency even if device is in silent mode (e.g., in silent mode for meeting when an emergency occurs with one of the user's emergency contacts or an emergency dispatcher contacting UE with an emergency condition).

In another embodiment, a 911 call is made by a subscriber. A 911 dispatcher sends a message to ab eSMLC server to locate the 911 caller. The 911 dispatcher transmits an Emergency Notification request to the emergency mediation server, which looks up the 911 caller's emergency contacts (family, friends, co-workers, doctors, etc.) as configured in a relevant Emergency Notification Group. The emergency mediation server sends a special alert to the device of each emergency contact indicating an emergency situation and location of 911 caller. The emergency mediation server sends contacts periodic messages with updates on 911 caller's location, as well as messages informing them when the 911 call ends. The 911 caller and contacts can share broadcast updates, and the 911 caller can transmit an "All Clear" message to the group.

In another embodiment, a 911 call is made by a third party regarding a subscriber, and the 3rd party is configured in the subscriber's Emergency Proxy Group. The 911 dispatcher sends message to an eSMLC server to locate a subscriber. The emergency mediation server 120 looks up the subscriber's details. The emergency mediation server determines the mobile network for the subscriber, and transmits commands to the eSMLC server to track the location of the subscriber. The server then reports back to the dispatcher the location of the subscriber, and continues to track and provide periodic updates to the dispatcher.

In another embodiment, a 911 call is made by a subscriber. The 911 dispatcher transmits a message to the eSMLC server to locate subscriber, and transmits a Multiparty Locate request to the emergency mediation server, which looks up the multiparty locate contacts (e.g., children) as configured in an Emergency Notification Group. The emergency system 130 determines the mobile network for each multiparty contact, and sends commands to the eSMLC server to track the location of each multiparty contact. The system reports the location of each multiparty contact to the dispatcher, and continues to track and provide location information.

In another embodiment, a 911 call is made by a subscriber. A dispatcher determines 911 caller is in a situation of heightened danger. The dispatcher sends a remote monitor request to the emergency mediation server, which transmits a message to the UE to silently turn on device audio and video for the subscriber. The UE continuously transmits audio and video without any notification on the UE that this is occurring, even if turned off or in airplane mode (e.g., the UE will continue to appear off or in airplane mode). The UE remains in this state until the emergency system transmits a message to the UE to stop remote monitoring.

In an embodiment in which a subscriber attempts to dial 911 without RF coverage, the call does not go through (e.g., hiking in a remote area). In such an embodiment, 911 emergency messages are queued up by the UE, and once RF coverage returns, the UE automatically sends text messages to emergency contacts.

In an embodiment, a cellular device is attached to a medical application or linked to device with the capability of providing measurements for medical purposes. In such an embodiment, when a medical emergency occurs (e.g., pulse stops, blood sugar drops), emergency messages with the user's location are automatically sent to members of an emergency contact list as configured in a relevant Emergency Notification Group.

In an embodiment, a subscriber can alert emergency contacts of the presence of an emergency without dialing 911 by providing an input into a UE. The user can define emergency buttons (e.g., roadside assistance, having a baby, sick at school, family member rushed to hospital, car accident) and can specify additional info. The emergency mediation server looks up the subscriber's emergency contacts (family, friends, co-workers, doctors, etc.). The emergency mediation server sends a special alert to devices of contacts indicating an emergency and a location of the subscriber, and sends periodic messages to contacts with updates on the emergency subscriber's location (if applicable to the emergency). The user affected by the emergency can send broadcast updates to group members (e.g., tow truck arrived), including a message indicating that the emergency situation is resolved.

What is claimed is:

1. A method for identifying and designating responders for an emergency situation, the method comprising:
   receiving, at an emergency server coupled to a wireless telecommunications network, a notification of an emergency situation;
   establishing a first geofence around a location of the emergency situation;
   determining a set of candidate responders registered to an area associated with the location of the emergency situation;
   transmitting a request for locations of user equipment (UEs) of the set of candidate responders to a location server;
   receiving the locations of the UEs from the location server;
   determining which UEs of candidate responders are within an area bounded by the geofence;
   transmitting first messages to the UEs, the first messages including a request to respond to the emergency situation;
   receiving second messages in response to the first messages, the second messages indicating a positive response to the request;
   adding identities of the UEs from which second messages were received to a list of one or more active responders; and
   tracking locations of the one or more active responders until the emergency situation is resolved.

2. The method of claim 1, wherein the location server is one of an enhanced Serving Mobile Location Server (eSMLC) and a Serving Mobile Location Server (SMLC).

3. The method of claim 1, further comprising:
   determining a number of active responders to respond to the emergency; and
   when a number of the UEs of candidate responders is less than the number of active responders to respond to the emergency, enlarging the size of the geofence to include additional candidate responders.

4. The method of claim 1, further comprising:
   establishing a second geofence around the first geofence; and
   transmitting third messages to candidate responders within the second geofence and outside of the first geofence.

5. The method of claim 1, wherein the third messages alert recipients of the presence of the emergency situation.

6. The method of claim 1, further comprising:
   providing locations of active responders to an emergency coordinator.

7. The method of claim 1, wherein the set of candidate responders includes volunteer responders and professional responders.

8. The method of claim 1, wherein the notification of the emergency situation is received by the emergency server from a UE of a subject of the emergency situation.

9. The method of claim 8, further comprising:
   providing the locations of the one or more active responders to the subject of the emergency situation.

10. The method of claim 1, wherein the notification of the emergency situation is received by the emergency server from an emergency call center.

11. An emergency management system including coupled to a cellular telecommunications network, the system comprising an emergency response server with at least one processor that performs the following operations:
    receiving a notification of an emergency situation;
    establishing a first geofence around a location of the emergency situation;
    determining a set of candidate responders registered to an area associated with the location of the emergency situation;
    transmitting a request for locations of user equipment (UEs) of the set of candidate responders to a location server;
    receiving the locations of the UEs from the location server;
    determining which UEs of candidate responders are within an area bounded by the geofence;
    transmitting first messages to the UEs, the first messages including a request to respond to the emergency situation;
    receiving second messages in response to the first messages, the second messages indicating a positive response to the request;
    adding identities of the UEs from which second messages were received to a list of one or more active responders; and
    tracking locations of the one or more active responders until the emergency situation is resolved.

12. The system of claim 11, wherein the location server is one of an enhanced Serving Mobile Location Server (eSMLC) and a Serving Mobile Location Server (SMLC).

13. The system of claim 11, wherein the emergency server determines a number of active responders to respond to the emergency; and
    when a number of the UEs of candidate responders is less than the number of active responders to respond to the emergency, enlarging the size of the geofence to include additional candidate responders.

14. The system of claim 11, wherein the emergency server establishes a second geofence around the first geofence, and transmits third messages to candidate responders within the second geofence and outside of the first geofence.

15. The system of claim 11, wherein the third messages alert recipients of the presence of the emergency situation.

16. The system of claim 11, wherein the emergency server provides locations of active responders to an emergency coordinator.

17. The system of claim 11, wherein the set of candidate responders includes volunteer responders and professional responders.

18. The system of claim 11, wherein the notification of the emergency situation is received by the emergency server from a UE of a subject of the emergency situation.

19. The system of claim 18, wherein the emergency server provides the locations of the one or more active responders to the subject of the emergency situation.

20. The system of claim 11, wherein the notification of the emergency situation is received by the emergency server from an emergency call center.

* * * * *